US012561512B2

(12) United States Patent
Maschmeyer et al.

(10) Patent No.: US 12,561,512 B2
(45) Date of Patent: *Feb. 24, 2026

---

(54) METHODS AND SYSTEMS FOR PROMPTING LARGE LANGUAGE MODEL TO GENERATE FORMATTED OUTPUT

(71) Applicant: Shopify Inc., Ottawa (CA)

(72) Inventors: Russ Maschmeyer, Berkeley, CA (US);
David Goligorsky, Stockholm (SE);
Daniel Beauchamp, Toronto (CA);
Benjamin Michel, London (GB)

(73) Assignee: SHOPIFY INC., Ottawa (CA)

( * ) Notice: Subject to any disclaimer, the term of this patent is extended or adjusted under 35 U.S.C. 154(b) by 167 days.

This patent is subject to a terminal disclaimer.

(21) Appl. No.: 18/491,370

(22) Filed: Oct. 20, 2023

(65) Prior Publication Data

US 2024/0311546 A1 Sep. 19, 2024

Related U.S. Application Data

(60) Provisional application No. 63/501,841, filed on May 12, 2023, provisional application No. 63/490,103, filed on Mar. 14, 2023.

(51) Int. Cl.
*G06F 40/106* (2020.01)
*G06F 40/169* (2020.01)
*G06F 40/205* (2020.01)

(52) U.S. Cl.
CPC .......... *G06F 40/106* (2020.01); *G06F 40/169* (2020.01); *G06F 40/205* (2020.01)

(58) Field of Classification Search
CPC ..... G06F 40/169; G06F 40/205; G06F 40/106
See application file for complete search history.

(56) References Cited

U.S. PATENT DOCUMENTS

| | | | | |
|---|---|---|---|---|
| 11,481,545 B1 * | 10/2022 | Aviles | ................... | G06F 40/186 |
| 2009/0265612 A1 * | 10/2009 | Cheney | ................. | H04L 9/3263 |
| | | | | 709/206 |
| 2022/0036153 A1 * | 2/2022 | O'Malia | ................. | G06F 40/40 |

(Continued)

OTHER PUBLICATIONS

Tomasz Mrozewski, "Adding title and heading tags to a Word document", Sep. 24, 2021, OJS for YDJ, 3 pages https://pressbooks. library.yorku.ca/ojsforydj/chapter/adding-title-and-heading-tags-to-a-word-document/.*

(Continued)

*Primary Examiner* — Adam M Queler
*Assistant Examiner* — David Faber
(74) *Attorney, Agent, or Firm* — Smart & Biggar LP

(57) ABSTRACT

The present disclosure describes a technical solution that enables a trained large language model (LLM) to generate a revised text in a manner that enables the LLM to preserve formatting that was present in the original text. When a text-editing instruction is received for a text passage having a formatting tag, the text passage is processed to identify the formatting tag in the text passage. The LLM is prompted to generate a revised text passage, using a prompt that includes the text-editing instruction and that also includes a formatting-specific instruction to format the revised text passage using the formatting tag in the revised text passage. The revised text passage is received and caused to be displayed based on the formatting tag, such that the formatting of the original text is maintained.

21 Claims, 8 Drawing Sheets

(56) References Cited

U.S. PATENT DOCUMENTS

| | | | |
|---|---|---|---|
| 2022/0108079 A1* | 4/2022 | Roisman ............... | G06F 40/154 |
| 2022/0374608 A1 | 11/2022 | Shazeer | |
| 2023/0289515 A1* | 9/2023 | Jayaraj Devadoss ........................ | |
| | | | G06F 40/169 |
| 2024/0086051 A1* | 3/2024 | Ciminelli ........... | G06F 3/04845 |
| 2024/0127617 A1 | 4/2024 | Amamou | |
| 2024/0143698 A1* | 5/2024 | Shirwadkar .............. | G06N 3/08 |

OTHER PUBLICATIONS

Wu, Tongshuang, et al., "Promptchainer: Chaining large language model prompts through visual programming." CHI Conference on Human Factors in Computing Extended Abstracts. 2022, 10 pages.
Yuan, Ann, et al., "Wordcraft: story writing with large language models", Proceedings of the 27th International Conference on Intelligent User Interfaces. 2022, 12 pages.
Canadian Intellectual Property Office, "International Search Report and Written Opinion" for International Application No. PCT/CA2023/051099 dated Nov. 20, 2023, 9 pages.

* cited by examiner

700

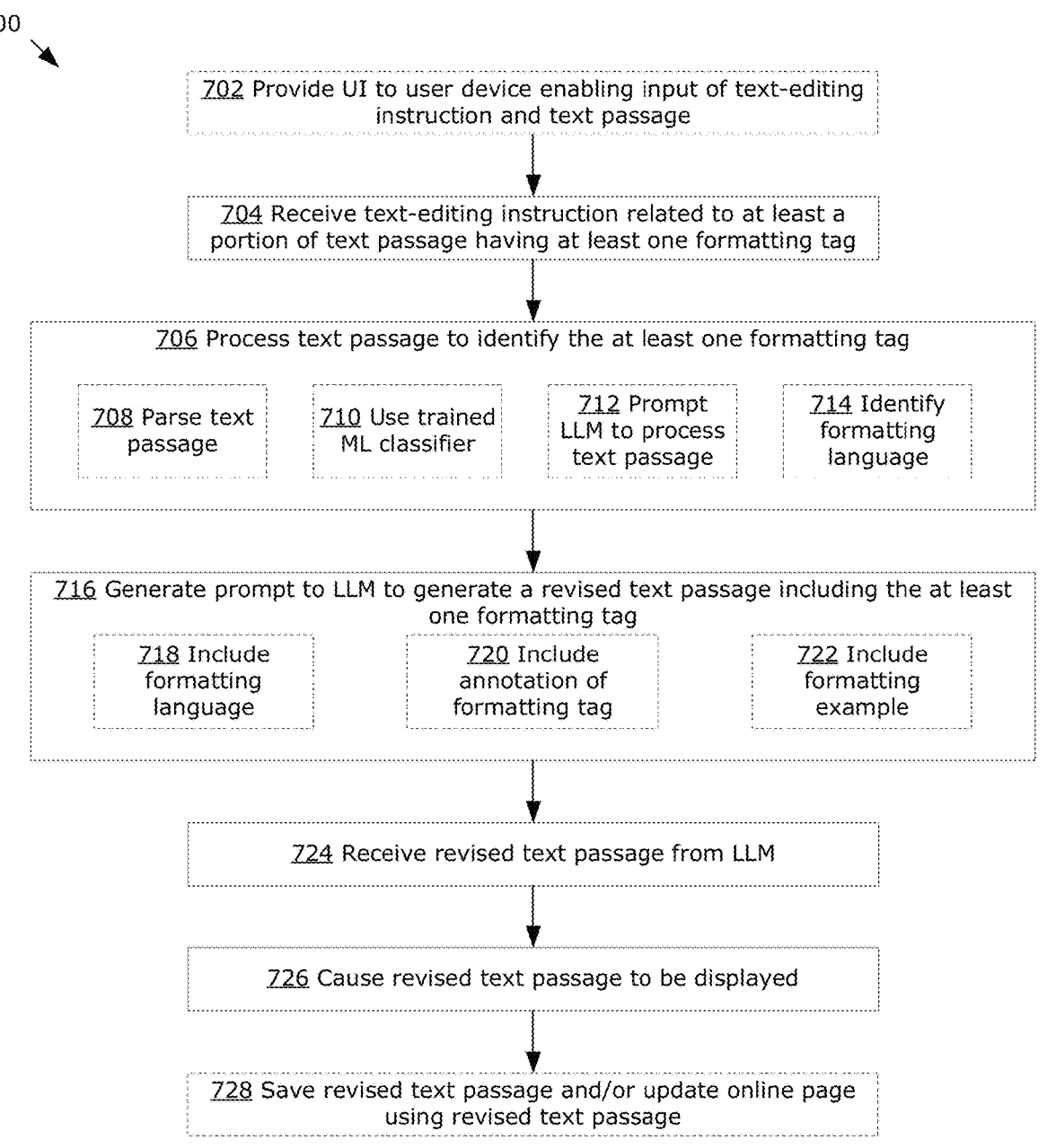

702 Provide UI to user device enabling input of text-editing instruction and text passage 704 Receive text-editing instruction related to at least a portion of text passage having at least one formatting tag 706 Process text passage to identify the at least one formatting tag 708 Parse text passage 710 Use trained ML classifier 712 Prompt LLM to process text passage 714 Identify formatting language 716 Generate prompt to LLM to generate a revised text passage including the at least one formatting tag 718 Include formatting language 720 Include annotation of formatting tag 722 Include formatting example 724 Receive revised text passage from LLM 726 Cause revised text passage to be displayed 728 Save revised text passage and/or update online page using revised text passage

FIG. 4

METHODS AND SYSTEMS FOR PROMPTING LARGE LANGUAGE MODEL TO GENERATE FORMATTED OUTPUT

CROSS-REFERENCE TO RELATED APPLICATIONS

The present disclosure claims priority from U.S. provisional patent application No. 63/490,103, filed Mar. 14, 2023, entitled "METHODS AND SYSTEMS FOR PROMPTING LARGE LANGUAGE MODEL TO GENERATE FORMATTED OUTPUT"; and U.S. provisional patent application No. 63/501,841, filed May 12, 2023, entitled "METHODS AND SYSTEMS FOR PROMPTING LARGE LANGUAGE MODEL TO GENERATE FORMATTED OUTPUT"; the entireties of which are all hereby incorporated by reference.

FIELD

The present disclosure relates to machine learning, and, more particularly, to generation of prompts to large language models (LLMs), and, yet more particularly, to prompting an LLM to process a formatted input to generate a formatted output.

BACKGROUND

A large language model (LLM) is a type of machine learning (ML) model that is capable of generating text output, including natural language text output. A LLM may be provided with a prompt, which may be a natural language instruction that instructs the LLM to generate a desired output, including natural language text or other generative output.

SUMMARY

Online services for revising a block of text are provided. Some such services employ machine learning (ML). In some existing ML-based services for revising an inputted block of text, the user is typically limited to inputting text without any formatting (e.g., without formatting tags such as HTML tags, Markdown tags, etc.) and the revised text is similarly unformatted. However, in many situations the user might wish to revise a block of formatted text. Existing ML-based services that fail to recognize formatting in the text can result in inadvertently destroying the desired formatting when the revised text is generated.

For example, if the original text is formatted as a list, an existing ML-based service may erroneously consider the formatting tags for the list to be part of the text to be revised. As a result, the generated revised text may inadvertently rewrite the formatting tags for the list format and the revised text would no longer be formatted as a list. In another example, if the original text is formatted as a table having specific column labels, the existing ML-based service may inadvertently revise the column labels thus changing the meaning of the table in the revised text.

Workarounds, such as the user manually extracting only the unformatted portion of text to send to the ML-based service for revision can be tedious and/or may have worse performance due to loss of contextual information. Additionally, such workarounds may not be able to generate additional text that has similar formatting.

In various examples, the present disclosure describes a technical solution that enables a trained LLM to generate a revised text in a manner that enables the LLM to preserve formatting that was present in the original text. Examples of the present disclosure provide a technical solution for automatically identifying a formatting tag in the original text and to generate a prompt that includes a formatting-specific instruction related to the identified formatting tag. This provides a technical advantage by enabling the LLM to maintain the formatting of the original text.

Another technical advantage is that by enabling formatted text and/or formatting information to be included in the prompt, the overall performance of the LLM may be improved (e.g., the LLM may generate revised text that is more relevant and/or cohesive).

User interactions may also be improved because the user may not need to manually add or remove formatting tags in the original text or in the generated revised text. Additionally, the user may not even need to be aware of the formatting language (e.g., HTML, Markdown, LaTex, etc.) used in the original text, thus making the process of revising the text more intuitive and transparent to the user.

In some examples, the present disclosure provides a text-editing user interface (UI). The UI may enable the user to provide a text-editing instruction to generate a revised text from an inputted text passage having at least one formatting tag. The UI may also enable the revised text to be displayed with formatting.

In various examples, the present disclosure describes a technical solution that may be provided by an online platform (e.g., a Software as a Service (SaaS) platform). The platform may serve as an interface layer between a user device and the LLM, to improve accessibility to the LLM. In some examples, the platform may use an application programming interface (API) to access the LLM.

In an example aspect, the present disclosure describes a system including a processing unit configured to execute computer-readable instructions to cause the system to: receive at least one text-editing instruction related to at least a portion of a text passage having at least one formatting tag; process the text passage to identify the at least one formatting tag in the text passage; generate a prompt to a large language model (LLM) to generate a revised text passage, the prompt including the text-editing instruction related to at least the portion of the text passage, the prompt further including a formatting-specific instruction to format the revised text passage using the at least one formatting tag in the revised text passage; receive the revised text passage generated based on the prompt; and cause the revised text passage to be displayed based on the formatting tag.

In an example of the example preceding system, the processing unit may be configured to execute instructions to further cause the system to: provide, to a user device, a user interface (UI) for inputting the at least one text-editing instruction and the text passage having the at least one formatting tag; wherein the at least one text-editing instruction and the text passage are received from the user device; and wherein the revised text passage is outputted to the user device and the user device is caused to display the revised text passage via the UI.

In an example of any of the example preceding systems, the processing unit may be configured to execute computer-readable instructions to further cause the system to process the text passage by: parsing the text passage to identify the at least one formatting tag; wherein the formatting-specific instruction is included in the prompt responsive to the at least one formatting tag being identified by the parsing.

In an example of the example preceding system, the processing unit may be configured to execute computer-readable instructions to further cause the system to process the text passage by: parsing the text passage to identify a formatting language of the at least one formatting tag; wherein the formatting-specific instruction includes the identified formatting language.

In an example of the example preceding system, the processing unit may be configured to execute computer-readable instructions to further cause the system to process the text passage by: processing the text passage using trained classifier that has been trained to classify text formatting, the trained classifier outputting a class label identifying a formatting language of the at least one formatting tag; wherein the formatting-specific instruction includes the identified formatting language.

In an example of the example preceding system, the trained classifier may have been further trained to annotate formatting tags belonging to the identified formatting language, wherein the trained classifier further outputs an annotated text passage annotating the at least one formatting tag; wherein the formatting-specific instruction further includes an instruction to format the revised text passage using the annotated at least one formatting tag in the revised text passage.

In an example of any of the example preceding systems, the processing unit may be configured to execute computer-readable instructions to further cause the system to process the text passage by: generating a processing prompt to the LLM including the text passage, the prompt also including an instruction to cause the LLM to annotate the text passage to identify the at least one formatting tag; wherein the formatting-specific instruction includes the annotated text passage and an instruction to format the revised text passage using the annotated at least one formatting tag in the revised text passage.

In an example of any of the example preceding systems, the processing unit may be configured to execute computer-readable instructions to further cause the system to: process the text passage by parsing the text passage to identify a category of a text related to the at least one formatting tag; generate a formatting example to include in the prompt by retrieving, from a text database, an example text belonging to the identified category; and applying the at least one formatting tag to the example text; wherein the formatting-specific instruction includes the formatting example.

In another example aspect, the present disclosure describes a method including: receiving at least one text-editing instruction related to at least a portion of a text passage having at least one formatting tag; processing the text passage to identify the at least one formatting tag in the text passage; generating a prompt to a large language model (LLM) to generate a revised text passage, the prompt including the text-editing instruction related to at least the portion of the text passage, the prompt further including a formatting-specific instruction to format the revised text passage using the at least one formatting tag in the revised text passage; receiving the revised text passage generated based on the prompt; and causing the revised text passage to be displayed based on the formatting tag.

In an example of the example preceding method, the method may further include: providing, to a user device, a user interface (UI) for inputting the at least one text-editing instruction and the text passage having the at least one formatting tag; wherein the at least one text-editing instruction and the text passage are received from the user device; and wherein the revised text passage is outputted to the user device and the user device is caused to display the revised text passage via the UI.

In an example of any of the example preceding methods, processing the text passage may include: parsing the text passage to identify the at least one formatting tag; wherein the formatting-specific instruction is included in the prompt responsive to the at least one formatting tag being identified by the parsing.

In an example of the example preceding method, processing the text passage may include: parsing the text passage to identify a formatting language of the at least one formatting tag; wherein the formatting-specific instruction includes the identified formatting language.

In an example of any of the example preceding methods, processing the text passage may include: processing the text passage using trained classifier that has been trained to classify text formatting, the trained classifier outputting a class label identifying a formatting language of the at least one formatting tag; wherein the formatting-specific instruction includes the identified formatting language.

In an example of the example preceding method, the trained classifier may have been further trained to annotate formatting tags belonging to the identified formatting language, wherein the trained classifier further outputs an annotated text passage annotating the at least one formatting tag; wherein the formatting-specific instruction further includes an instruction to format the revised text passage using the annotated at least one formatting tag in the revised text passage.

In an example of any of the example preceding methods, processing the text passage may include: generating a processing prompt to the LLM including the text passage, the prompt also including an instruction to cause the LLM to annotate the text passage to identify the at least one formatting tag; wherein the formatting-specific instruction includes the annotated text passage and an instruction to format the revised text passage using the annotated at least one formatting tag in the revised text passage.

In an example of any of the example preceding methods, the method may include: processing the text passage by parsing the text passage to identify a category of a text related to the at least one formatting tag; generating a formatting example to include in the prompt by retrieving, from a text database, an example text belonging to the identified category; and applying the at least one formatting tag to the example text; wherein the formatting-specific instruction includes the formatting example.

In another example aspect, the present disclosure describes a non-transitory computer-readable medium storing instructions executable by a processing unit of a computing system to cause the system to: receive at least one text-editing instruction related to at least a portion of a text passage having at least one formatting tag; process the text passage to identify the at least one formatting tag in the text passage; generate a prompt to a large language model (LLM) to generate a revised text passage, the prompt including the text-editing instruction related to at least the portion of the text passage, the prompt further including a formatting-specific instruction to format the revised text passage using the at least one formatting tag in the revised text passage; receive the revised text passage generated based on the prompt; and cause the revised text passage to be displayed based on the formatting tag.

In an example of the example preceding non-transitory computer-readable medium, the instructions may be executable to further cause the system to: provide, to a user device, a user interface (UI) for inputting the at least one text-editing instruction and the text passage having the at least one formatting tag; wherein the at least one text-editing instruction and the text passage are received from the user device; and wherein the revised text passage is outputted to the user device and the user device is caused to display the revised text passage via the UI.

In an example of any of the example preceding non-transitory computer-readable media, the instructions may be executable to further cause the system to process the text passage by: parsing the text passage to identify the at least one formatting tag; wherein the formatting-specific instruction is included in the prompt responsive to the at least one formatting tag being identified by the parsing.

In an example of the example preceding non-transitory computer-readable medium, the instructions may be executable to further cause the system to process the text passage by: parsing the text passage to identify a formatting language of the at least one formatting tag; wherein the formatting-specific instruction includes the identified formatting language.

In an example of any of the example preceding non-transitory computer-readable media, the instructions may be executable to further cause the system to process the text passage by: processing the text passage using trained classifier that has been trained to classify text formatting, the trained classifier outputting a class label identifying a formatting language of the at least one formatting tag; wherein the formatting-specific instruction includes the identified formatting language.

In an example of the example preceding non-transitory computer-readable medium, the trained classifier may have been further trained to annotate formatting tags belonging to the identified formatting language, wherein the trained classifier further outputs an annotated text passage annotating the at least one formatting tag; wherein the formatting-specific instruction further includes an instruction to format the revised text passage using the annotated at least one formatting tag in the revised text passage.

In an example of any of the example preceding non-transitory computer-readable media, the instructions may be executable to further cause the system to process the text passage by: generating a processing prompt to the LLM including the text passage, the prompt also including an instruction to cause the LLM to annotate the text passage to identify the at least one formatting tag; wherein the formatting-specific instruction includes the annotated text passage and an instruction to format the revised text passage using the annotated at least one formatting tag in the revised text passage.

In an example of any of the example preceding non-transitory computer-readable media, the instructions may be executable to further cause the system to: process the text passage by parsing the text passage to identify a category of a text related to the at least one formatting tag; generate a formatting example to include in the prompt by retrieving, from a text database, an example text belonging to the identified category; and applying the at least one formatting tag to the example text; wherein the formatting-specific instruction includes the formatting example.

BRIEF DESCRIPTION OF THE DRAWINGS

Reference will now be made, by way of example, to the accompanying drawings which show example embodiments of the present application, and in which:

FIG. 4 is a flowchart illustrating an example method for prompting a LLM, in accordance with examples of the present disclosure;

Similar reference numerals may have been used in different figures to denote similar components.

DETAILED DESCRIPTION

Figure 1A:
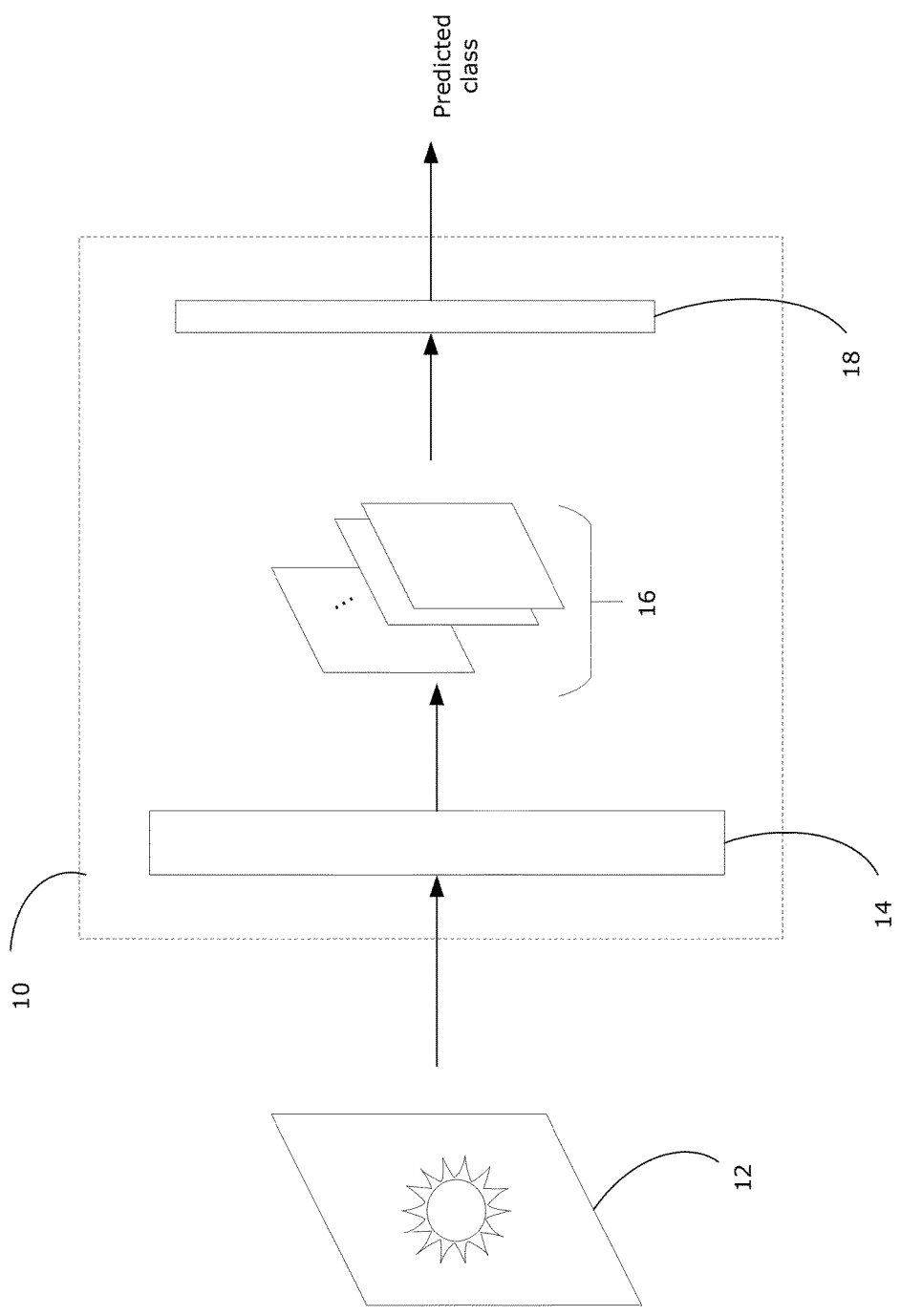
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
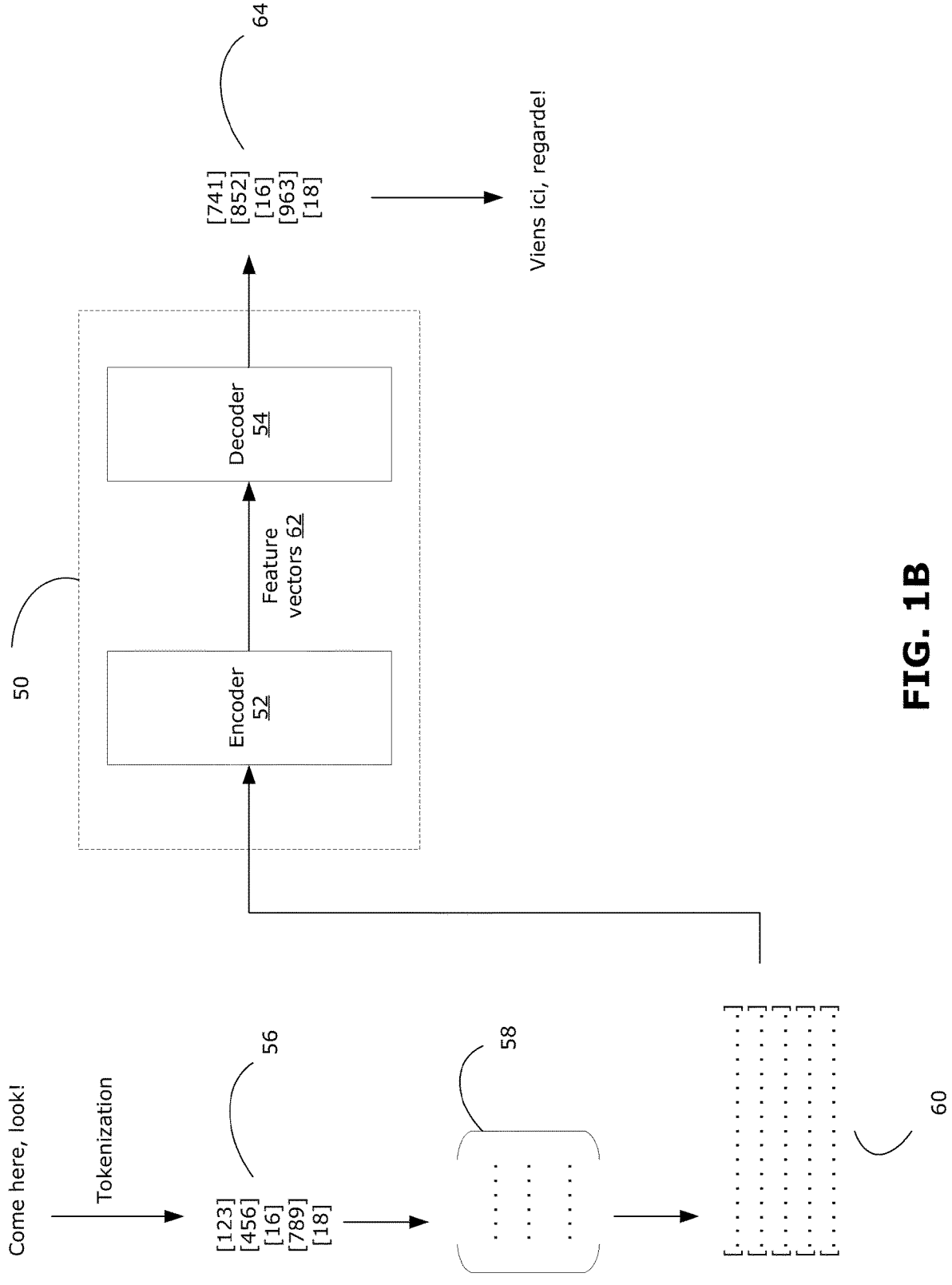
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
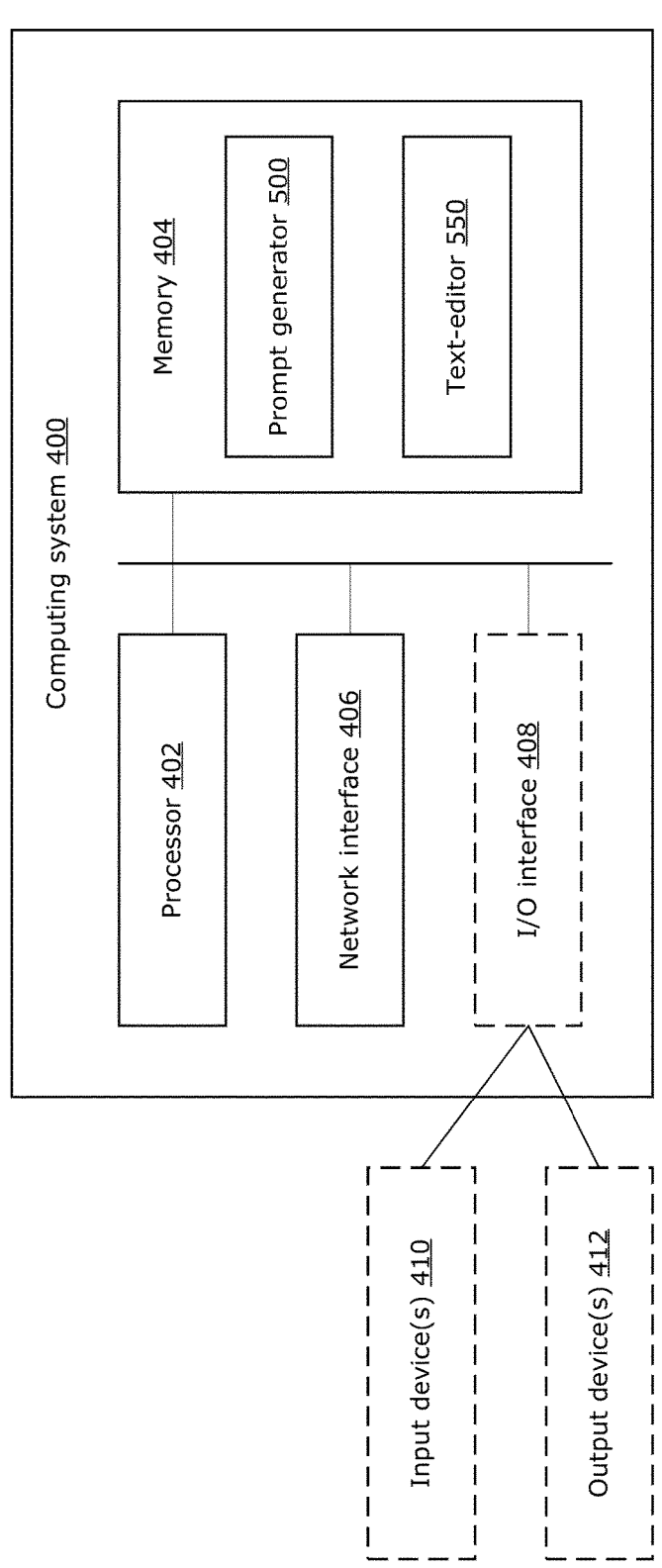
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

In the example of FIG. 2, the computing system 400 may store in the memory 404 computer-executable instructions, which may be executed by a processing unit such as the processor 402, to implement one or more embodiments disclosed herein. For example, the memory 404 may store instructions for implementing prompt generator 500 and/or text-editor 550 applications. In some examples, the computing system 400 may be a server of an online platform that provides the prompt generator 500 and text-editor 550 as web-based or cloud-based services that may be accessible by a user device (e.g., via communications over a wireless network). In some examples, the computing system 400 may be a user device that provides the text-editor 550 as a software application while another embodiment of the computing system 400 may be a server of the online platform that provides the prompt generator 500. Other such variations may be possible without departing from the subject matter of the present disclosure.

In various examples, the present disclosure provides methods and systems for generating a revised text using a trained LLM, in a manner that enables the LLM to process a text passage that includes formatting (e.g., includes at least one formatting tag) to generate a revised text passage that is also formatted (e.g., including the same or different formatting tag). In some examples, the formatting tag in the inputted text passage may be identified by a rules-based parser. In some examples, the formatting tag in the inputted text passage may be identified using a trained classifier. In some examples, the formatting tag in the inputted text passage may be identified using the LLM.

The prompt generator 500, for example, may receive a text passage to be revised (e.g., communicated from a user device over a wireless network). The prompt generator 500 may also receive a text-editing instruction, which may be from a user device (e.g., a user may input a natural language text-editing instruction such as "make this more professional", or a user may select from among predefined text-editing instructions such as selecting one of three defined styles) or may be a default text-editing instruction (e.g., defined by the platform hosting the prompt generator 500). Notably, the text passage includes at least one formatting tag, which may be in any suitable formatting language such as HTML, Markdown, LaTex, etc. The text-editing instruction may be related to a portion of the text passage (e.g., a user-selected portion of text), which may or may not include the at least one formatting tag, or may be related to the entire text passage.

As will be discussed further below, the prompt generator 500 processes the text passage to identify the at least one formatting tag. Optionally, the prompt generator 500 may also identify the formatting language (or formatting type) and/or formatting syntax. In some examples, depending on the formatting language, an identified formatting tag may be a particular character or combination of characters (e.g., characters such as **, [|], >, line break, etc. may be recognized formatting tags in Markdown). It should be understood that the use of the term "formatting tag" in the present disclosure is intended to encompass any character or combination of characters, which may include alphanumeric characters, characters expressed in Unicode, non-alphanumeric characters (e.g., Greek characters) as well as emoji characters, that can be recognized as applying a formatting.

After identifying the formatting tag, the prompt generator 500 automatically inserts instructions into a generated prompt to cause the LLM to preserve the formatting. In some examples, the prompt generator 500 may include one or more examples in the prompt to enable the LLM to understand the formatting style to be preserved. Additional details will be discussed further below.

The text-editor 550 may provide a UI that enables a user to compose and/or edit a block of text (e.g., a text document). The text-editor 550 may be locally accessible on a user device of the user (e.g., may be an application on a user device such as a desktop computer, smartphone, tablet, laptop, etc.) or may be an online service, provided by an online platform, that is accessible to the user device via a communication link (e.g., over a wireless network) with the platform.

The text-editor 550 may enable a user to select a portion of text (e.g., single word, phrase, sentence, paragraph) to be revised within a larger text passage. Alternatively or additionally, if no portion of text is selected then the entire text passage may be subject to revision. For example, the text-editor 550 may provide a UI that enables a user to select a portion of text (e.g., using a mouse, keyboard, touchscreen, etc.), and to input (e.g., via keyboard, microphone, etc.) text-editing instructions related to the selected portion of text. The user-selected portion of text may or may not include formatting tag(s) present in the text passage. Further, the user-selected portion of text may include an incomplete formatting tag (e.g., the user may select only a portion of a formatting tag, or may select only one of a pair of formatting tags). If text-editing instructions are provided as verbal input, a speech-to-text converter may be used to convert the verbal input into textual instructions. In some examples, the user may select from a defined set of text-editing instructions (e.g., select from a list of defined editing styles). Any suitable mechanism may be provided for a user to input a text-editing instruction. The text-editor 550 may have a defined default text-editing instruction if no text-editing instruction is provided by the user.

Figure 3A:
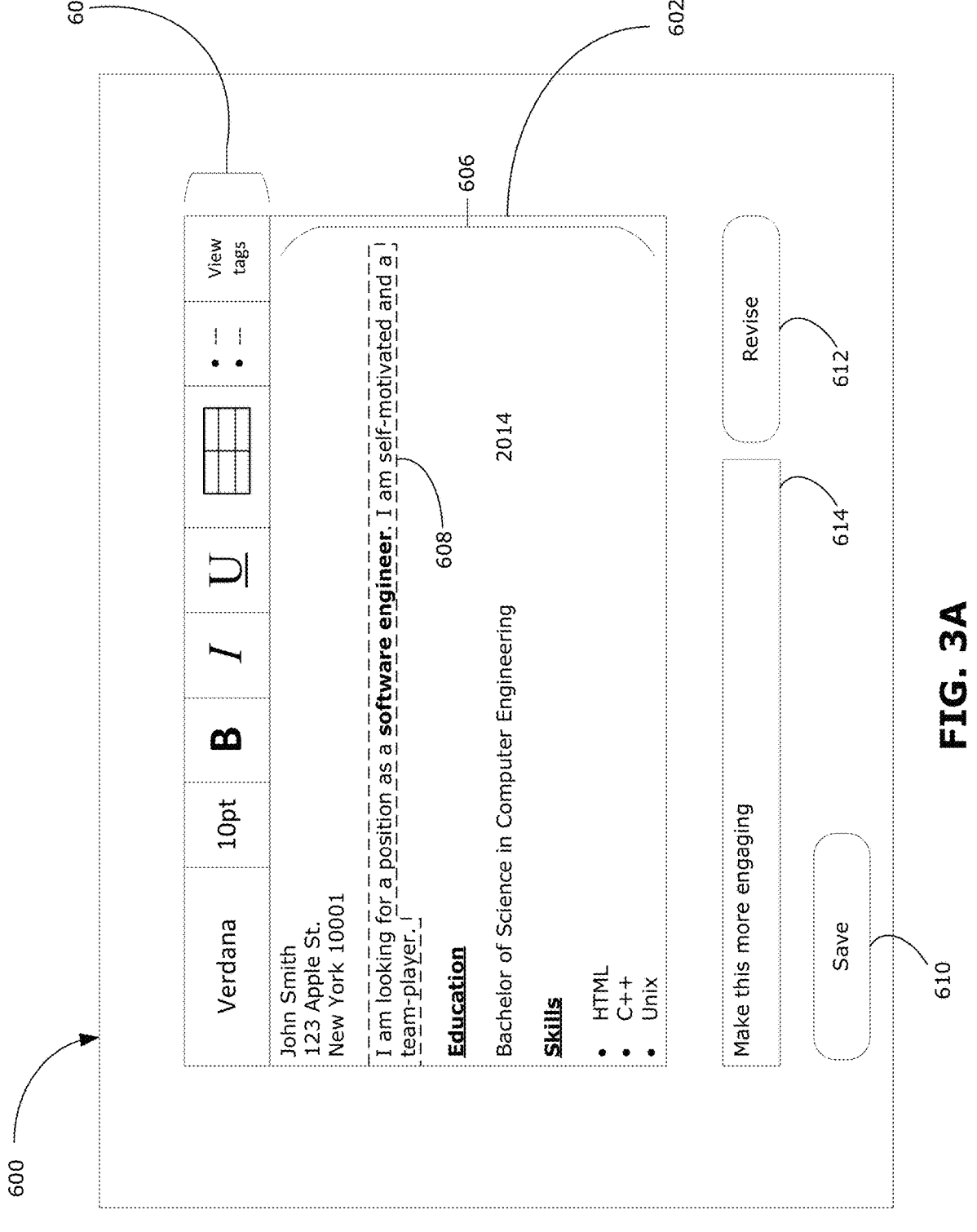
FIGS. 3A and 3B illustrate examples of a text-editing UI that may be provided in accordance with examples of the present disclosure.
Figure 3B:
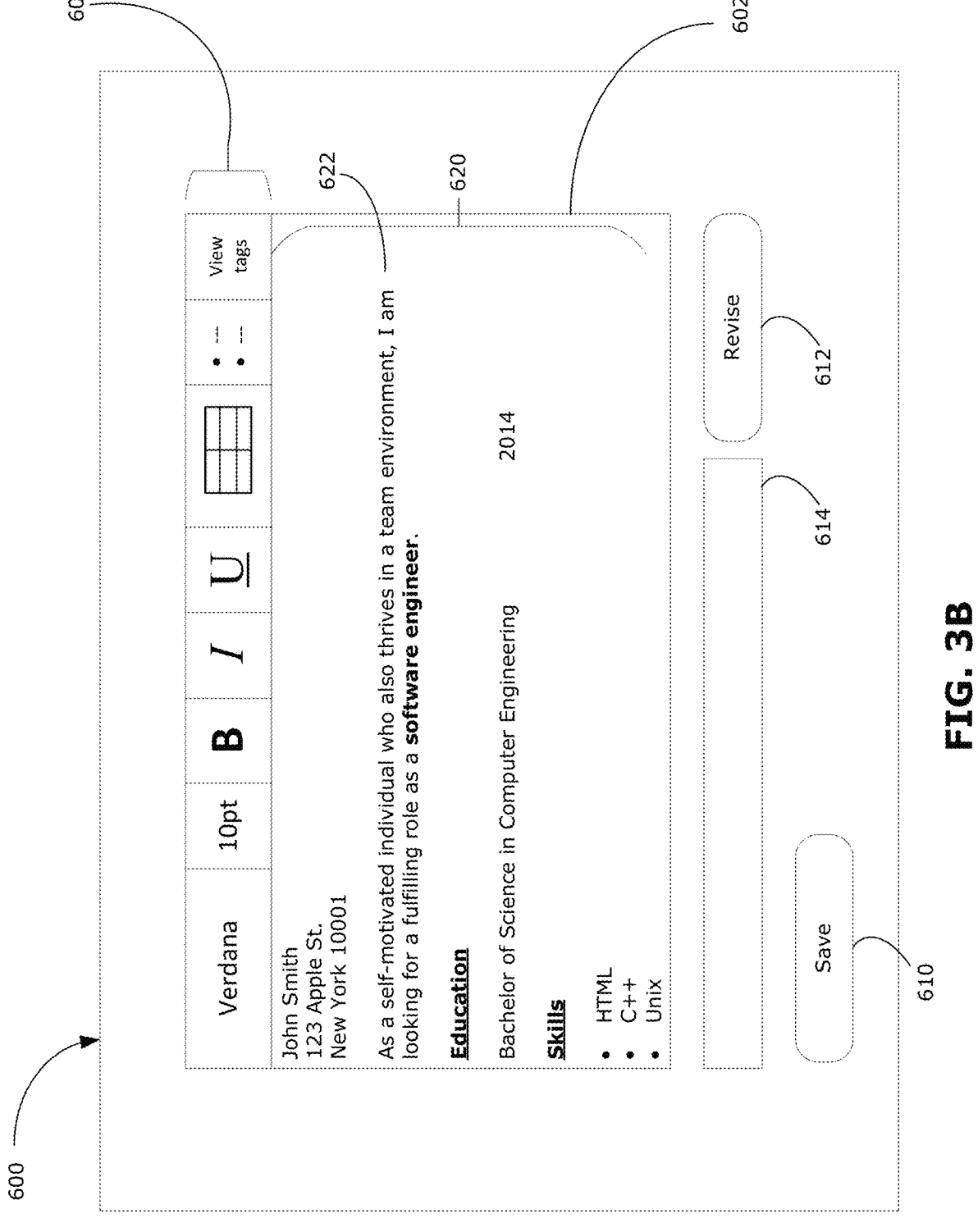

FIGS. 3A and 3B illustrate an example user interface (UI) 600 that may be provided by the text-editor 550.

As shown in FIG. 3A, the text-editor 550 may be used to input and/or revise a professional profile, which may be saved and/or uploaded as part of an online user profile managed by an online platform. However, this is not intended to be limiting. The UI 600 may include a text input field 602 and a formatting bar 604. A text passage 606 may be inputted (e.g., manually typed, uploaded, copied, imported, etc.) into the text input field 602. The text passage 606 may include one or more formatting tags (e.g., to indicate selected font, selected font size, bold formatting, underlining, bulleted list, etc.). The UI 600 may render the formatting tag(s) such that the text passage 606 is displayed as formatted text (i.e., "what you see is what you get") rather than displaying the formatting tag(s). The formatting bar 604 may include one or more options for formatting the text passage 606, such as options for selecting a font, selecting a font size, adding bold formatting, adding underlining, adding italics, adding table formatting, adding list formatting, etc. The formatting bar 604 in this example also includes an option for toggling the formatting tags on or off. When the formatting tags are toggled on (e.g., "view tags" is selected), the text passage 606 is shown with unrendered formatting tag(s) instead of being rendered as formatted text; when the formatting tags are toggle off (e.g., "view tags" is unselected), the text passage 606 is shown with the formatting tag(s) rendered. In the example of FIG. 3A, the text passage 606 is rendered as formatted text, where the formatting tags (not shown) include tags for bold formatting, underlining, bulleted list, tab space, and line breaks. Optionally, a portion of text 608 may be selected (as indicated by the use of a dashed box) to be revised. The selected portion of text 608 may be a single word, a phrase, a sentence, or multiple sentences, for example. In the example of FIG. 3A, the selected portion of text 608 includes formatted text (e.g., "software engineer" is in bold formatting). If tags are used (e.g., in the text-editing instruction or in the text passage 606) to indicate the selected portion of text 608, then the formatting may be indicated by other tags within the selected portion of text 608. If there is no selected portion of text, then the entire text passage 606 may be considered to be subject to revision.

The UI 600 may include a user element that is a selectable save option 610. Selection of the save option 610 may cause the text passage 606 to be stored locally (e.g., on the user device) and/or on the online platform (e.g., saved on cloud-based storage). Selection of the save option 610 may additionally or alternatively cause the text passage 606 to be uploaded or published on the online platform (e.g., published as part of an online user profile, uploaded onto a webpage, etc.), depending on the application.

The UI 600 may also include a user element that is a selectable revise option 612. The revise option 612 in this example is provided with a related text-editing instruction input field 614 in which a user may manually input a text-editing instruction (or which may be automatically populated with a default text-editing instruction). Selection of the revise option 612 may cause the text-editing instruction and the text passage 606 to be provided to the prompt generator 500. For example, the text-editing instruction may be provided as data or metadata linked with the text passage 606 and if there is a selected portion of text 608 then the selected portion may also be indicated by metadata.

FIG. 3B illustrates the example UI 600 displaying a revised text passage 620 in the text input field 602. The revised text passage 620 may be generated by an LLM after the text passage 606 and text-editing instruction of FIG. 3A is sent for revision by selection of the revise option 612. As shown in FIG. 3B, the revised text passage 620 includes a revised portion of text 622. Additionally, the revised text passage 620 maintains the formatting of the original text passage 606. That is, the revised text passage 620 includes at least one or at least some of the formatting tag(s) of the original text passage 606. Notably, the formatting of the formatted text in the original selected portion of text 608 (e.g., "software engineer" with bold formatting) is preserved in the revised portion of text 622. In this example, the UI 600 may automatically render the formatting tag(s) in the revised text passage 620 to display the revised text as formatted text. It may be noted that the revised text passage 620 may be further revised, for example by optionally selecting a portion of text (which may be the same previously selected portion of text or a different portion of text), inputting another text-editing instruction in the text-editing instruction input field 614 and selecting the revise option 612 again. In this way, the UI 600 may enable the user to iteratively revise a formatted text passage.

It should be understood that the UI 600 is only exemplary and is not intended to be limiting. Regardless of how the text-editing instruction and the text passage are provided to the prompt generator 500, the prompt generator 500 performs operations to generate a prompt to a LLM to cause the LLM to generate a revised text passage from an original text passage.

A text passage having at least one formatting tag and a related text-editing instruction may be received by the prompt generator 500 (e.g., via the text-editor 550). Because the text can be formatted in various ways (and may include formatting tags from different formatting languages or different formatting syntaxes), the prompt generator 500 may first perform operations to identify the formatting tag(s) in the text passage. The prompt generator 500 may implement one or a combination of techniques to identify any formatting tag(s) in the text passage.

For example, the prompt generator 500 may implement a rules-based parser. The parser may process the text passage and identify any formatting tags and their formatting language based on the known syntaxes of known formatting languages.

Additionally or alternatively, the prompt generator 500 may implement a trained ML classifier (e.g., a Bayesian filter, a deep neural network, etc.) to identify any formatting tags in the text passage. For example, the ML classifier may be trained on a dataset of text having known formatting tags in a known formatting language with known formatting syntax. If the prompt generator 500 is implemented on an online platform, for example, the training dataset may include text passages stored on the online platform (e.g., uploaded to the online platform by users). The online platform may anonymize the text passages before inclusion in the training dataset. The ML classifier that is trained in this way may be proprietary to the online platform. The trained ML classifier may process a text passage and output a single predicted class label to identify the overall formatting language (e.g., HTML, JSON, a flavor (or variant) of Markdown, etc.) of the text passage, or may output predicted class labels to identify the formatting language of each formatting tag in the text passage. Additionally or alternatively, the trained ML classifier may automatically annotate the text passage with labels or metadata identifying the formatting tag(s) within the text passage.

In some examples, the prompt generator 500 may generate a series of prompts to the LLM, using a technique referred to as prompt chaining. Conceptually, prompt chaining may involve providing a series of prompts that enable the LLM to generate a desired output step-by-step. The prompt generator 500 may first generate a processing prompt to the LLM to instruct the LLM to process the text passage to identify and annotate any formatting tags. An example of processing instructions that may be included in a processing prompt to the LLM is as follows:

1. Find all the formatting tags in the following text
2. Annotate the formatting tags with ***, for example
***<bold>

The output from the LLM may be the text passage with any formatting tags annotated (according to the defined syntax provided in the processing instructions, in this example annotated using *). Then the prompt generator 500 may generate a second prompt to the LLM that includes an instruction to maintain the formatting tag(s) indicated by the * annotation.

It should be noted that the prompt generator 500 may use any of the above-discussed techniques (or any combination of the above-discussed techniques) to identify the formatting tag(s) in the text passage. The prompt generator 500 may additionally or alternatively use any other suitable technique to identify the formatting tag(s) in the text passage.

In some examples, the prompt generator 500 may identify the formatting tag(s) in the text passage without identifying the formatting language or formatting syntax. In other examples, identifying the formatting tag may involve determining the formatting language and the syntax used in the determined formatting language. For example, if the formatting language is Markdown, then identifying the formatting tag(s) may involve determining the formatting language is a particular flavor (or variant) of Markdown and that, in the syntax of that particular flavor of Markdown, a particular character or combination of characters (e.g., **, [|], >, line break, etc.) is a formatting tag.

In some examples, the prompt generator 500 may process the text passage to identify the presence of at least one formatting tag, without necessarily identify the formatting tag itself. It may be sufficient for the prompt generator 500 to generate a prompt that instructs the LLM based on the presence of at least one formatting tag in the text passage, without specifically identifying the formatting tag in the text passage. For example, the prompt generator 500 may include instructions to the LLM such as:

1. The following text includes formatting
2. Revising the text but keep all existing formatting In some examples, the prompt generator 500 may determine that the text passage belongs to a particular domain, where a domain refers to a particular category of text such as a product description, a product review, a business letter, a shipping policy, a dating profile, etc. Two text passages belonging to the same domain may be expected to use a similar formatting style (e.g., a business letter may be expected to have an address at the top, followed by paragraphs of text). Determination of the domain may be, for example, based on explicit input (e.g., user selection or indication of the domain of the text, for example by selecting the domain using a drop-down box provided in a text-editor UI). In some examples, determination of the domain may be based on implicit information. For example, if the text revision is a service provided by the online platform in the context of a product catalog or product webpage, then it may be determined (based on the context) that the text passage is in the domain of product descriptions. In another example, if the text revision is a service provided by the online platform within the context of a user profile, then it may be determined (based on the context) that the text passage is in the domain of a user description. The prompt generator 500 may or may not determine the domain of the text passage. In examples where the domain of the text passage is determined, information about the domain may be used to generate the prompt to the LLM.

Regardless of how the prompt generator 500 identifies the formatting tag(s) and/or formatting language in the text passage, the prompt generator 500 generates a prompt to the LLM that includes a formatting-specific instruction to format the revised text passage using the identified formatting tag(s) and/or formatting language. In some examples where a portion of text within the text passage has been selected for revision, the selected portion of text may be annotated by the prompt generator 500 using tags (e.g., <tag start> to indicate the start of the selected portion and </tag end> to indicate the end of the selected portion).

For example, if the prompt generator 500 has identified the text passage to include at least one HTML formatting tag (e.g., using a rules-based parser or using a trained ML classifier), the generated prompt may include a formatting-specific instruction, such as (example 1):

1. Rewrite the text between the tags <tag start> and </tag end>
2. Do not change any other text
3. Do not change any HTML tags In some examples, instead of "Do not change any HTML tags", the formatting-specific instruction may include "Reproduce all HTML tags in their current place" or other similar instruction to cause the LLM to maintain the HTML formatting tags. The prompt generator 500 may, based on the identified formatting language, select a predefined formatting-specific instruction (from a set of predefined formatting-specific instructions) to insert into the generated prompt. Such predefined formatting-specific instructions may include formatting-specific instructions for each of a plurality of possible formatting languages that are identifiable by the prompt generator 500. For example, if the prompt generator 500 has identified HTML as the formatting language used in the text passage, the formatting-specific instruction "Do not change any HTML tags" may be selected and inserted into the generated prompt. On the other hand, if the prompt generator 500 has identified Markdown as the formatting language used in the text passage, the prompt generator 500 may select the formatting-specific instruction "Do not change any Markdown formatting" to insert into the generated prompt.

In another example, if the prompt generator 500 has not identified the formatting language but has identified the presence of formatting tags (e.g., based on the syntax that formatting tags are enclosed by angled brackets < >), the generated prompt may include a formatting-specific instruction, such as (example 2):

1. Rewrite the text between the tags <tag start> and </tag end>
2. Do not change any other text
3. Do not change any text enclosed in < >

Similar to the prior discussion of example 1, the formatting-specific instruction may use other similar instructions to cause the LLM to maintain formatting tags enclosed in angled brackets (or according to any other formatting syntax). The prompt generator 500 may, after identifying the presence of formatting tags enclosed in angled brackets (or other formatting syntax), insert a particular predefined formatting-specific instruction in the generated prompt.

In another example, if the prompt generator 500 has identified the presence of a particular formatting tag or formatting character (e.g., emoticons), the prompt may include a formatting-specific instruction as follows (example 3):

1. Rewrite the text between the tags <tag start> and </tag end>
2. Do not change any other text
3. Do not rewrite any text that is in Unicode range 1F600 to 1F64F In example 3, the prompt generator 500 may identify the presence of text in the Unicode range 1F600 to 1F64F as an emoticon, which may be considered a formatting character. The prompt generator 500 may insert the formatting-specific instruction to preserve any formatting character in the Unicode range 1F600 to 1F64F.

In some examples, the text passage may include formatting tags according to a certain formatting style. A formatting style refers to a particular combination or arrangement of formatting tags. For example, a formatted text passage may have a formatting style where each line of text is preceded by an emoji and ended by a line break. Such formatting style may be particularly relevant in cases where the text passage belongs to a particular domain (e.g., product description, dating profile, business letter, product review, etc.) where text may be expected to be more structured.

The prompt generator 500 may parse the text passage, based on the expected structure (according to the determined domain of the text passage) to segment the text passage into certain categories of text. For example, if the text passage is in the domain of a product description, the text passage may be expected to follow a structure where the product name appears first, followed by a product explanation, followed by shipping information. Thus, the prompt generator 500 may parse the text passage into a first text segment categorized as "product name", a second text segment categorized as "product explanation" and a third text segment categorized as "shipping information".

In another example, the prompt generator 500 may, for example, use a trained ML classifier to segment and classify sections of the text passage into specific categories (or classes) of text, based on the particular domain. For example, a text passage in the domain of product description may be processed by a trained ML classifier into a text segment under the category "product name", a second text segment under the category "product explanation", and a third text segment under the category "shipping information". An appropriate ML classifier (e.g., a deep neural network) may be trained using a dataset including text passages that have been annotated with such class labels for particular text segments.

Regardless of how the text passage is segmented into different categories of text, after the prompt generator 500 has classified the text segments of the text passage, the prompt generator 500 may process each text segment (e.g., using a parser, another trained ML classifier, or using prompt chaining, as discussed previously) to identify any formatting tag(s) related to each category of text. The prompt generator 500 may then use this information to automatically generate one or more examples which may then be included in the formatting-specific instruction in the prompt to the LLM.

For example, the prompt generator 500 may have access to a text database containing text that has been labelled according to different categories of text. This may be the case where the prompt generator 500 is implemented by an online platform and the online platform maintains a database of categorized text data (which may be anonymized) collected from user interactions with the online platform. It may be noted that the text data may be unstructured. Additionally, instead of being labelled by category, the text data may be labelled by fields or types. The prompt generator 500 may automatically select text examples from the text database according to the categories of text identified in the text passage to be revised. The prompt generator 500 may then automatically apply formatting tag(s) identified in each category of text in the text passage to the corresponding example text belonging to the same category, in order to generate an example text that is formatted in a similar manner. This automatically generated example text may then be included in the prompt to the LLM, in order to provide one-shot or few-shot training.

For example, the prompt generator 500 may generate a prompt including a formatting-specific instruction such as in the following example illustrating formatting using HTML (example 4):

1. Rewrite the text between the tags <tag start> and </tag end>
2. Do not change any other text
3. Follow the formatting in this example:

---

```
<bold>Peanuts-R-Us peanut butter</bold><br>
<ul>
    <li>Peanuts</li>
    <li>Salt</li>
    <li>Sunflower oil</li>
```

-continued

```
</ul>
<i>Same-day shipping</i>
```

The inclusion of one (or a few) examples of formatted text in the prompt may help to instruct the LLM on how the revised text should be formatted in order to preserve the formatting of the original text passage.

In some examples, the prompt generator 500 may include example text indicating how a revised text passage should be formatted compared to the formatting of an example original text passage, such as shown in the following example illustrating formatting using Markdown (example 5):

1. Rewrite the text between the tags <tag start> and </tag end>
2. Do not change any other text
3. Follow the formatting in this example:

```
Original text:
| Pros        | Cons  |
| ----------- | ----------- |
| Fast        | Bad        |
| Easy   |   Wrong |
becomes revised text:
| Advantages        | Disadvantages |
| ----------- | ----------- |
| Quick        | Inconsistent |
| Simple    | Inaccurate |
```

The examples described above illustrate how a prompt generator 500, in accordance with the present disclosure, may generate a prompt to a LLM to cause the LLM to generate a revised text passage that has formatting matching the formatting of the original text passage. The generated prompt may be tokenized (by the prompt generator 500 or by a tokenization module of the platform) and the tokens may be included in an API call to the LLM. Alternatively or additionally, the prompt may be sent directly by API call to the LLM and tokenization may occur within the LLM itself or at a remote system at which the LLM is implemented.

The LLM-generated revised text passage is received from the LLM and may be presented for display via a user device. For example, the platform may receive the revised text passage from the LLM as a response to an API call, and the platform may send data to the user device over a communication link (e.g., over a wireless network) to enable the revised text passage to be displayed on the user device (e.g., to be viewed via a UI provided by the text-editor 550). The formatting tag(s) in the revised text passage may be rendered such that the revised text passage is displayed as formatted text.

FIG. 4 is a flowchart of an example method 700 which may be performed by a computing system, in accordance with examples of the present disclosure. For example, a processing unit of a computing system (e.g., the processor 402 of the computing system 400 of FIG. 2) may execute instructions (e.g., instructions of the prompt generator 500 and/or text-editor 550) to cause the computing system to carry out the example method 700. The method 700 may, for example, be implemented by an online platform or a server.

Optionally, at an operation 702, a UI (e.g., the UI 600, which may be provided by the text-editor 550) may be provided to a user device. The UI may enable input of a text passage having at least one formatting tag and/or input of one or more text-editing instructions related to at least a portion of the text passage.

At an operation 704, a text-editing instruction is received (e.g., by the prompt generator 500) related to at least a portion of a text passage. In some examples, the text-editing instruction and/or the text passage may be received from a user device (e.g., via user interaction with a text-editing UI). The text passage includes at least one formatting tag. Formatting of the text passage may use any suitable formatting language or combination of formatting languages. In some examples, formatting of the text passage may use a formatting character (e.g., unique characters specific according to a particular formatting language) instead of or in addition to a formatting tag. In some examples, the term formatting tag may include formatting characters.

At an operation 706, the text passage is processed to identify the at least one formatting tag in the text passage. As described previously, the text passage may be processed (e.g., by the prompt generator 500) using various techniques. For example, the operation 706 may be carried out using one or more of optional operations 708, 710, 712 and/or 714.

At optional operation 708, the text passage may be parsed (e.g., using a rules-based parser) to identify the at least one formatting tag. Identification of the at least one formatting tag may trigger the prompt generator 500 to include a formatting-specific instruction in a prompt to the LLM.

At optional operation 710, a trained ML classifier may be used to process the text passage and output an identification of the formatting tag and/or identification of a formatting language. The trained ML classifier may additionally or alternatively process the text passage to output an annotated text passage, in which the at least one formatting tag has been annotated according to a defined annotation syntax. If an annotated text passage is outputted, the annotated text passage may be included in the formatting-specific instruction in the prompt to the LLM.

At optional operation 712, a processing prompt may be generated to prompt the LLM to annotate the text passage to identify the at least one formatting tag. For example, the prompt generator 500 may generate a processing prompt that includes the text passage and also an instruction to the LLM to annotate any formatting tags in the text passage. If an annotated text passage is outputted, the annotated text passage may be included in the formatting-specific instruction in the prompt to the LLM.

At optional operation 714, the formatting language of the at least one formatting tag may be identified. Identification of the formatting language (e.g., HTML, Markdown (including a particular variant or flavor of Markdown), LaTex, etc.) may be performed as part of any of the optional operations 708, 710 and/or 712. If the formatting language is identified, information about the identified formatting language may be included in the formatting-specific instruction in the prompt to the LLM.

Regardless of how the operation 706 is carried out, following the operation 706 the method 700 proceeds to an operation 716.

At the operation 716, a prompt is generated (e.g., by the prompt generator 500) to the LLM to cause the LLM to generate a revised text passage. The prompt includes the text-editing instruction and also includes a formatting-specific instruction to cause the LLM to include the at least one formatting tag in the revised text passage. If a portion of text has been selected in the text passage, the prompt may include instructions to revise only the selected portion of text (e.g., by annotating the text passage to indicate the start and end of the selected portion of text and including instructions to revise only the text between the start and end annotations). If only a portion of text is selected for revision, the prompt may still include the entire text passage (including any formatting tag that is not part of the selected portion of text), which may help to provide contextual information to the LLM. Alternatively, windowing around the selected portion of text may be performed such that some of the text passage preceding and/or following the selected portion of text may be included in the prompt. Yet alternatively, only the selected portion of text may be included in the prompt. If no portion of text is selected, the entire text passage may be subject to revision. The operation 716 may be carried out using one or more of optional operations 718, 720 and/or 722.

At optional operation 718, if the formatting language of the at least one formatting tag was identified (e.g., at operation 714), then identification of the formatting language may be included in the formatting-specific instruction in the prompt. For example, the formatting-specific instruction may instruct the LLM to preserve any text that appears to be a formatting tag or formatting character in the identified formatting language (e.g., "Leave any HTML tags in place").

At optional operation 720, if an annotated text passage was generated including annotation of the at least one formatting tag (e.g., at operation 710 or 712), then the annotated text passage may be included in the formatting-specific instruction in the prompt. The formatting-specific instruction may further include an instruction to preserve the at least one formatting tag as indicated by the annotation (e.g., "Do not change any text enclosed by \*\*\*", where \*\*\* is the defined annotation syntax used to annotate the formatting tag in the annotated text passage).

At optional operation 722, one or a few formatting examples may be automatically generated and included in the formatting-specific instruction in the prompt. As discussed previously, the text passage may be processed (e.g., by the prompt generator 500) to identify a category of text for a text segment in the text passage. The at least one formatting tag in the text passage may be related to a particular identified category of text. Then a formatting example may be automatically generated by retrieving (e.g., from a text database) an example text belonging to the same identified category of text. The formatting tag may then be applied to the retrieved example text, thus obtaining a formatting example. This generated formatting example may then be included in the formatting-specific instruction to the LLM.

Regardless of how the operation 716 is performed, following the operation 716 the method 700 proceeds to operation 724.

At the operation 724, a revised text passage is received from the LLM, based on the prompt. For example, the generated prompt may be provided to the LLM (e.g., via an API call to a remote LLM). In some examples, the generated prompt may be converted to a set of tokens (e.g., using a suitable tokenization algorithm or software). For example, the prompt may be segmented into a sequence of text segments and each text segment may be converted to a NLP token (e.g., using a token lookup) while preserving the sequential order of the text segments. Then the set of tokens may be provided to the LLM (e.g., via an API call) in sequential order. Additionally or alternatively, the generated prompt may be provided to the LLM as-is (e.g., as a sequence of text without the tokenization described above). Tokenization of the prompt may be performed by the LLM or by a remote system. Regardless of how the prompt is provided to the LLM, the revised text passage generated by the LLM may be received in response to the API call. In particular, the revised text passage is formatted using the at least one formatting tag found in the original text passage.

At an operation 726, the revised text passage is caused to be displayed based on the formatting tag included in the revised text passage. The revised text passage may be caused to be displayed via a user device. For example, the revised text passage may be presented in a UI (e.g., the UI 600 described above) on a user device. The UI may render the formatting tag in the revised text passage such that the revised text passage is displayed as formatted text.

Optionally, at an operation 728, the revised text passage may be saved (e.g., stored locally on the user device and/or stored by the platform). Additionally or alternatively, the revised text passage may be used to update an online page. For example, depending on application, the revised text passage may be a user profile and may be used to update the user's online page, the revised text passage may be a product description and may be used to update an online product page, etc. In some examples, the saving and/or updating may be performed responsive to received input from a user (e.g., responsive to user selection of a save option or an update option via a UI).

In some examples, the LLM that is prompted to generate the revised text passage may be a general-purpose LLM. In other examples, a tuned LLM may be prompted to generate the revised text passage. For example, a tuned LLM may be trained by the platform to be formatting-specific (e.g., fine-tuned on a few thousand or a few tens of thousands of selected samples of formatted text) and the tuned LLM may be maintained by the platform. Different tuned LLMs may be trained to be specific to different formatting languages. The text passage may be first processed to identify the formatting language, then after identifying the formatting language, the appropriate tuned LLM may be selected to generate the revised text passage. In some examples, the tuned LLM may be trained using a training dataset that includes a selected plurality of formatting languages, such that the tuned LLM is specific to the selected plurality of formatting languages (e.g., specific to multiple flavors of Markdown).

In some examples, the tuned LLM may additionally or alternatively be trained to be domain-specific (e.g., fine-tuned on a few thousand or a few tens of thousands of selected samples of text in a particular domain). The tuned LLM may be trained to revise text of a particular domain (e.g., product descriptions, product reviews, business letters, user profile or dating profile) for a large number of possible formatting languages or for a specific (or a specific few) formatting language.

Each tuned LLM may, after training, be stored by the online platform. For example, the platform may store a first tuned LLM specific to HTML formatting, a second tuned LLM specific to JSON formatting, a third tuned LLM specific to product description domain, a fourth tuned LLM specific to dating profiles, etc. When there is a text passage to be revised, the platform may, after performing operations to identify the formatting language of the text passage and/or domain of the text passage, and select the appropriate tuned LLM to use for generating the revised text passage.

In some examples, the prompt generator 500 and/or the text-editor 550 may be services provided via an online platform. For example, the prompt generator 500 and/or the text-editor 550 may be software engines or software applications executed by the online platform. The online platform may provide web-based services to a user, including text revision services and/or LLM-based services. In some examples, the online platform may be a commerce platform.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
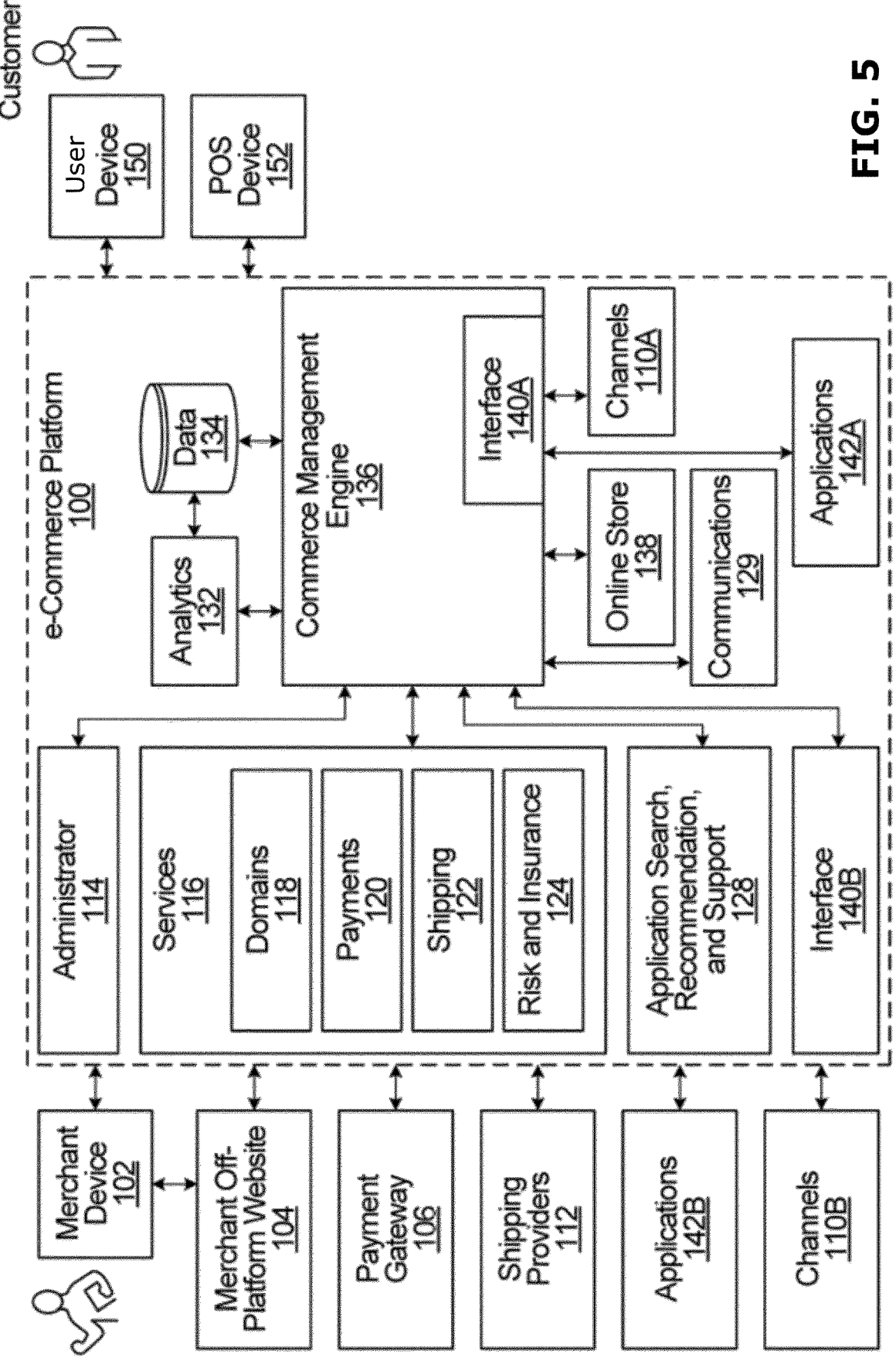
FIG. 5 is a block diagram of an example e-commerce platform, which may be an example implementation of the examples disclosed herein.

FIG. 5 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (selfservice) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 6:
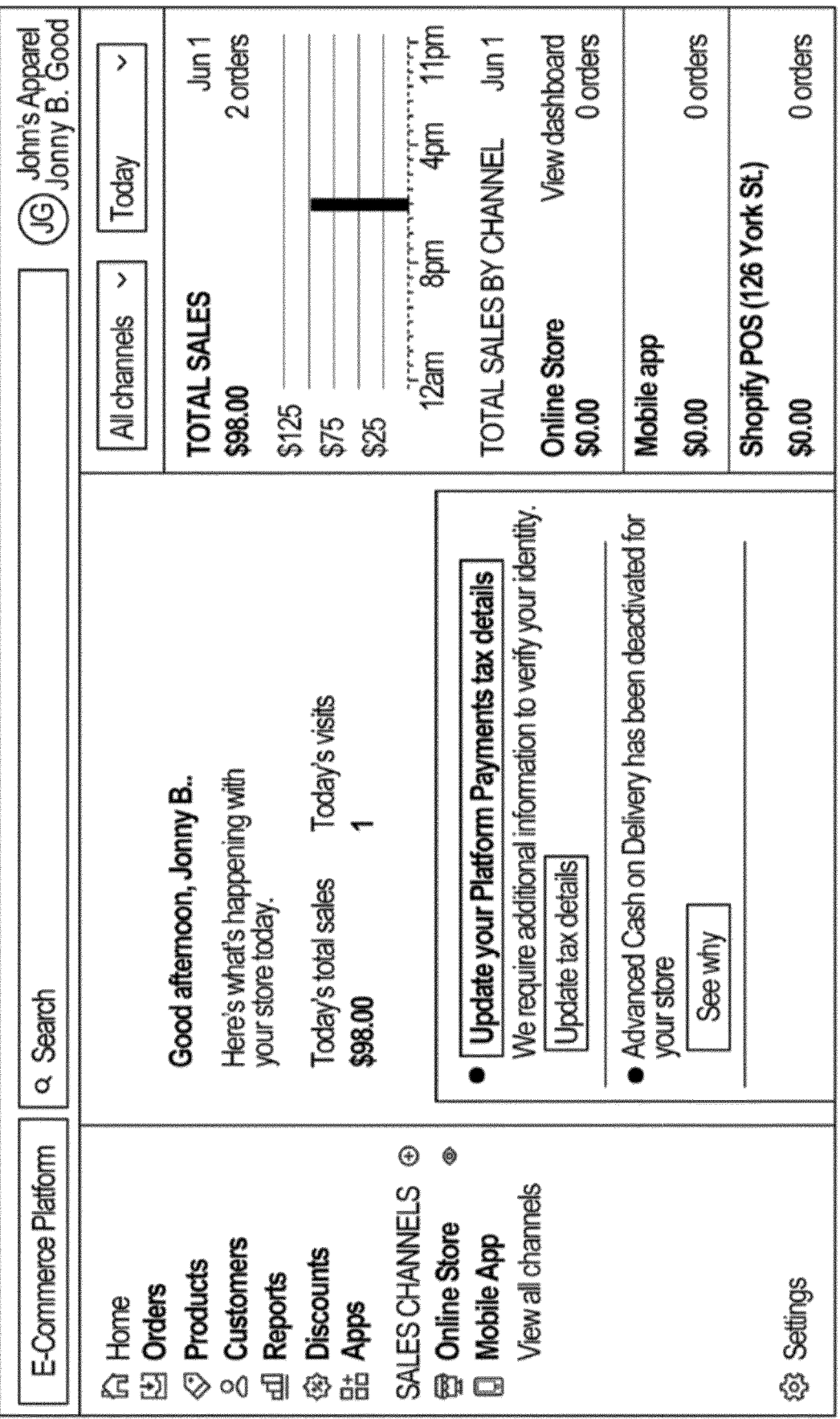
FIG. 6 is an example homepage of an administrator, which may be accessed via the e-commerce platform of FIG. 5.

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant access to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

The methods and systems (e.g., prompt generator 500 and/or text-editor 550) as disclosed herein may be provided by the e-commerce platform 100 as an online service to enable a user to conveniently and efficiently revise a formatted text passage (e.g., for revising a product description or for revising text for a page of an online store). It should be understood that the methods and systems disclosed herein may be provided as an online service by any other online platform (e.g., SaaS platform) without being limited to the e-commerce platform 100. The online platform may provide applications that serve as an interface layer between the user and the LLM, to enable the user to more effectively and efficiently make use of the LLM to generate a revised text passage that includes formatting, based on formatting that is present in the original text passage.

Examples of the present disclosure may enable a LLM to identify formatting in a text passage to be revised, and to generate a revised text passage that maintains the formatting. Instead of relying on workarounds or having to remove formatting in the text passage, the LLM may be able to process text passages including one or more formatting tags, which may enable greater efficiency and/or better performance. Extra processing to extract only the text and then to re-insert the formatting afterwards may be avoided. The LLM may be prompted with a larger section of text, because there may be no need to avoid text with formatting. This may enable more contextual information (e.g., a longer text passage) to be included in the prompt to the LLM and thus may result in better performance.

Examples of the present disclosure may provide an improved user experience because the formatting in the text passage may be made transparent to the user (e.g., the user does not even need to be aware of any formatting in the text being revised, nor does the user need to manually remove or insert any formatting tags).

Although the present disclosure has described a LLM in various examples, it should be understood that the LLM may be any suitable language model (e.g., including LLMs such as GPT-3 or ChatGPT, as well as other language models such as BART, among others). Additionally, it should be understood that the present disclosure is not limited to any particular language. Although English has been used in various examples, the present disclosure may be equally applicable to other human languages.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
a processing unit configured to execute computer-readable instructions to cause the system to:
receive at least one text-editing instruction related to at least a portion of a text passage having at least one formatting tag;
process the text passage to identify the at least one formatting tag in the text passage, and to identify a category of a text related to the at least one formatting tag;
generate a formatting example by:
retrieving, from a text database, an example text belonging to the identified category; and
applying the at least one formatting tag to the example text;
generate a first prompt to a large language model (LLM) to generate a revised text passage, the first prompt including the text-editing instruction related to at least the portion of the text passage, the first prompt further including a formatting-specific instruction to format the revised text passage using the at least one formatting tag in the revised text passage, the formatting-specific instruction including the formatting example;
cause the LLM to generate the revised text passage, using the first prompt as input to the LLM;
receive the revised text passage generated based on the first prompt; and
cause the revised text passage to be displayed by causing rendering of the at least one formatting tag to the revised text passage.

2. The system of claim 1, wherein the processing unit is configured to execute instructions to further cause the system to:
provide, to a user device, a user interface (UI) for inputting the at least one text-editing instruction and the text passage having the at least one formatting tag;
wherein the at least one text-editing instruction and the text passage are received from the user device; and wherein the revised text passage is outputted to the user device and the user device is caused to display the revised text passage via the UI.

3. The system of claim 1, wherein the processing unit is configured to execute computer-readable instructions to further cause the system to process the text passage by:

parsing the text passage to identify the at least one formatting tag;

wherein the formatting-specific instruction is included in the first prompt responsive to the at least one formatting tag being identified by the parsing.

4. The system of claim 3, wherein the processing unit is configured to execute computer-readable instructions to further cause the system to process the text passage by:

parsing the text passage to identify a formatting language of the at least one formatting tag;

wherein the formatting-specific instruction includes the identified formatting language.

5. The system of claim 1, wherein the processing unit is configured to execute computer-readable instructions to further cause the system to process the text passage by:

processing the text passage using trained classifier that has been trained to classify text formatting, the trained classifier outputting a class label identifying a formatting language of the at least one formatting tag;

wherein the formatting-specific instruction includes the identified formatting language.

6. The system of claim 5, wherein the trained classifier has been further trained to annotate formatting tags belonging to the identified formatting language, wherein the trained classifier further outputs an annotated text passage annotating the at least one formatting tag;

wherein the formatting-specific instruction further includes an instruction to format the revised text passage using the annotated at least one formatting tag in the revised text passage.

7. The system of claim 1, wherein the processing unit is configured to execute computer-readable instructions to further cause the system to process the text passage by:

generating a second prompt to the LLM including the text passage, the second prompt also including an instruction to cause the LLM to annotate the text passage to identify the at least one formatting tag;

wherein the formatting-specific instruction includes the annotated text passage and an instruction to format the revised text passage using the annotated at least one formatting tag in the revised text passage.

8. A method comprising:

receiving at least one text-editing instruction related to at least a portion of a text passage having at least one formatting tag;

processing the text passage to identify the at least one formatting tag in the text passage, and to identify a category of a text related to the at least one formatting tag;

generating a formatting example by:

retrieving, from a text database, an example text belonging to the identified category; and applying the at least one formatting tag to the example text;

generating a first prompt to a large language model (LLM) to generate a revised text passage, the first prompt including the text-editing instruction related to at least the portion of the text passage, the first prompt further including a formatting-specific instruction to format the revised text passage using the at least one formatting tag in the revised text passage, the formatting-specific instruction including the formatting example;

causing the LLM to generate the revised text passage, using the first prompt as input to the LLM;

receiving the revised text passage generated based on the first prompt; and causing the revised text passage to be displayed by causing rendering of the at least one formatting tag to the revised text passage.

9. The method of claim 8, further comprising:

providing, to a user device, a user interface (UI) for inputting the at least one text-editing instruction and the text passage having the at least one formatting tag;

wherein the at least one text-editing instruction and the text passage are received from the user device; and wherein the revised text passage is outputted to the user device and the user device is caused to display the revised text passage via the UI.

10. The method of claim 8, wherein processing the text passage comprises:

parsing the text passage to identify the at least one formatting tag;

wherein the formatting-specific instruction is included in the first prompt responsive to the at least one formatting tag being identified by the parsing.

11. The method of claim 10, wherein processing the text passage comprises:

parsing the text passage to identify a formatting language of the at least one formatting tag;

wherein the formatting-specific instruction includes the identified formatting language.

12. The method of claim 8, wherein processing the text passage comprises:

processing the text passage using trained classifier that has been trained to classify text formatting, the trained classifier outputting a class label identifying a formatting language of the at least one formatting tag;

wherein the formatting-specific instruction includes the identified formatting language.

13. The method of claim 12, wherein the trained classifier has been further trained to annotate formatting tags belonging to the identified formatting language, wherein the trained classifier further outputs an annotated text passage annotating the at least one formatting tag;

wherein the formatting-specific instruction further includes an instruction to format the revised text passage using the annotated at least one formatting tag in the revised text passage.

14. The method of claim 8, wherein processing the text passage comprises:

generating a second prompt to the LLM including the text passage, the second prompt also including an instruction to cause the LLM to annotate the text passage to identify the at least one formatting tag;

wherein the formatting-specific instruction includes the annotated text passage and an instruction to format the revised text passage using the annotated at least one formatting tag in the revised text passage.

15. A non-transitory computer-readable medium storing instructions executable by a processing unit of a computing system to cause the system to:

receive at least one text-editing instruction related to at least a portion of a text passage having at least one formatting tag;

process the text passage to identify the at least one formatting tag in the text passage, and to identify a category of a text related to the at least one formatting tag;

generate a formatting example by:

retrieving, from a text database, an example text belonging to the identified category; and applying the at least one formatting tag to the example text;

generate a first prompt to a large language model (LLM) to generate a revised text passage, the first prompt including the text-editing instruction related to at least the portion of the text passage, the first prompt further including a formatting-specific instruction to format the revised text passage using the at least one formatting tag in the revised text passage, the formatting-specific instruction including the formatting example;

cause the LLM to generate the revised text passage, using the first prompt as input to the LLM;

receive the revised text passage generated based on the first prompt; and cause the revised text passage to be displayed by causing rendering of the at least one formatting tag to the revised text passage.

16. The non-transitory computer-readable medium of claim 15, wherein the instructions are executable to further cause the system to:

provide, to a user device, a user interface (UI) for inputting the at least one text-editing instruction and the text passage having the at least one formatting tag;

wherein the at least one text-editing instruction and the text passage are received from the user device; and wherein the revised text passage is outputted to the user device and the user device is caused to display the revised text passage via the UI.

17. The non-transitory computer-readable medium of claim 15, wherein the instructions are executable to further cause the system to process the text passage by:

parsing the text passage to identify the at least one formatting tag;

wherein the formatting-specific instruction is included in the first prompt responsive to the at least one formatting tag being identified by the parsing.

18. The non-transitory computer-readable medium of claim 17, wherein the instructions are executable to further cause the system to process the text passage by:

parsing the text passage to identify a formatting language of the at least one formatting tag;

wherein the formatting-specific instruction includes the identified formatting language.

19. The non-transitory computer-readable medium of claim 15, wherein the instructions are executable to further cause the system to process the text passage by:

processing the text passage using trained classifier that has been trained to classify text formatting, the trained classifier outputting a class label identifying a formatting language of the at least one formatting tag;

wherein the formatting-specific instruction includes the identified formatting language.

20. The non-transitory computer-readable medium of claim 19, wherein the trained classifier has been further trained to annotate formatting tags belonging to the identified formatting language, wherein the trained classifier further outputs an annotated text passage annotating the at least one formatting tag;

wherein the formatting-specific instruction further includes an instruction to format the revised text passage using the annotated at least one formatting tag in the revised text passage.

21. The non-transitory computer-readable medium of claim 15, wherein the instructions are executable to further cause the system to process the text passage by:

generating a second prompt to the LLM including the text passage, the second prompt also including an instruction to cause the LLM to annotate the text passage to identify the at least one formatting tag;

wherein the formatting-specific instruction includes the annotated text passage and an instruction to format the revised text passage using the annotated at least one formatting tag in the revised text passage.

* * * * *